(12) United States Patent
Gravis et al.

(10) Patent No.: US 10,284,755 B2
(45) Date of Patent: May 7, 2019

(54) NODAL MONITORING DEVICE AND SYSTEM

(71) Applicant: Auglle, LLC, Boerne, TX (US)

(72) Inventors: Valdis Gravis, San Antonio, TX (US); James McVey, Fair Oaks Ranch, TX (US); Ivan Aponte, Santa Rosa de Lima (VE)

(*) Notice: Subject to any disclaimer, the term of this patent is extended or adjusted under 35 U.S.C. 154(b) by 122 days.

(21) Appl. No.: 15/460,144

(22) Filed: Mar. 15, 2017

(65) Prior Publication Data

US 2017/0272625 A1    Sep. 21, 2017

Related U.S. Application Data

(60) Provisional application No. 62/309,326, filed on Mar. 16, 2016.

(51) Int. Cl.
| | | |
|---|---|---|
| *G03B 17/08* | (2006.01) | |
| *H04N 5/225* | (2006.01) | |
| *H04N 7/18* | (2006.01) | |
| *G08B 13/196* | (2006.01) | |

(52) U.S. Cl.
CPC ..... *H04N 5/2252* (2013.01); *G08B 13/19619* (2013.01); *G08B 13/19632* (2013.01); *G08B 13/19656* (2013.01); *H04N 7/183* (2013.01)

(58) Field of Classification Search
CPC . H04N 13/305; H04N 13/317; G02B 27/2214
See application file for complete search history.

(56) References Cited

U.S. PATENT DOCUMENTS

| | | | | |
|---|---|---|---|---|
| 2003/0214601 A1* | 11/2003 | Yuen | ...................... | H04N 5/232 348/375 |
| 2011/0235335 A1* | 9/2011 | Ishida | ...................... | F21S 8/086 362/296.01 |
| 2015/0195431 A1* | 7/2015 | Pacurariu | ............... | G03B 17/56 348/375 |
| 2015/0195442 A1* | 7/2015 | Pacurariu | ........... | H04N 5/23203 348/211.2 |

* cited by examiner

*Primary Examiner* — Howard D Brown, Jr.
(74) *Attorney, Agent, or Firm* — John C. Cave; Gunn, Lee & Cave, P.C.

(57) ABSTRACT

A monitoring device with a board case having an open end and a closed end partially defining a lower housing space; a lid connected to the board case at the closed end to define an upper housing space; a power supply within the first housing space; a printed circuit board assembly (PCBA) within the lower housing space and electrically connected through the closed end of the board case to the power supply, the PCBA having a CPU module with computer readable memory; a bracket assembly within the lower housing space; a camera module mechanically fixed to the bracket assembly; and a lens cover at least partially surrounding the camera module. In a network with a plurality of such devices, each device may be configured to communicate directly with each of the other monitoring devices without the use of a centralized server.

10 Claims, 5 Drawing Sheets

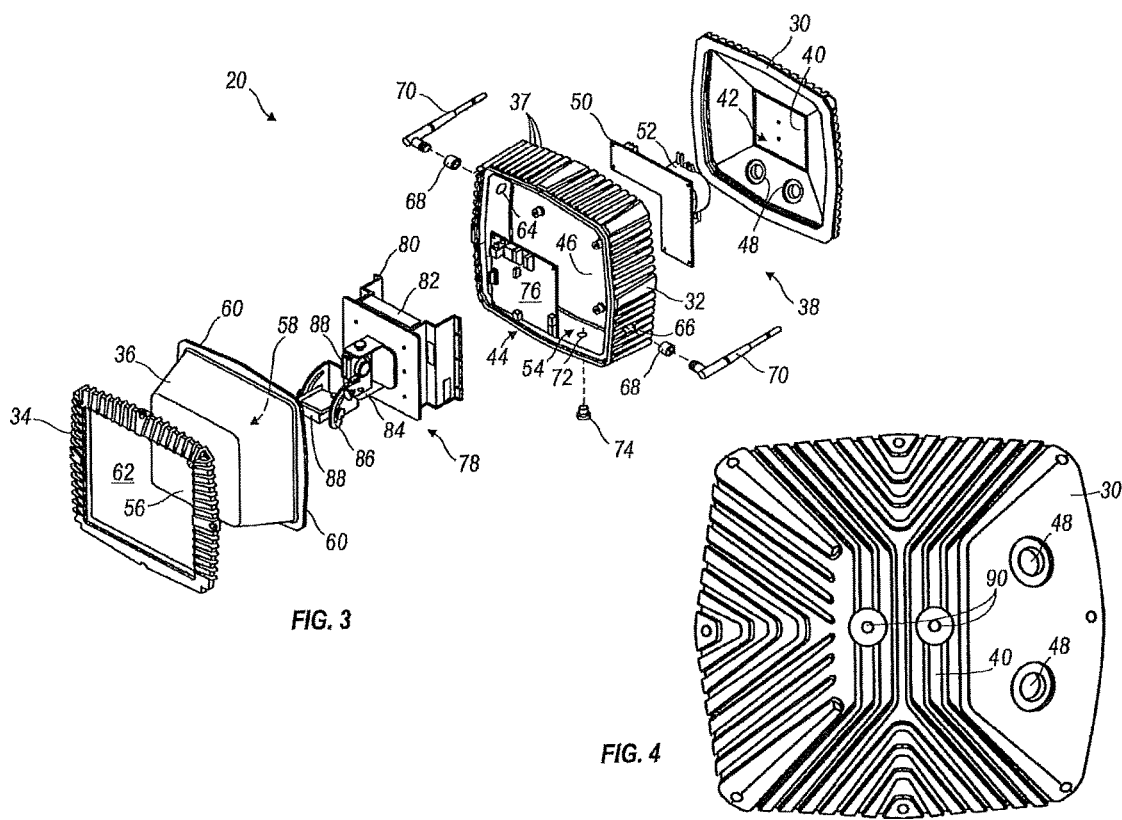

NODAL MONITORING DEVICE AND SYSTEM

CROSS REFERENCE TO RELATED APPLICATIONS

This utility application claims priority to and the benefit of U.S. Provisional Application Ser. No. 62/309,326, filed Mar. 16, 2016. Said application is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to a modular, nodal monitoring device and system. More specifically, the invention relates to a self-contained and stand-alone monitoring device. A system may be made up of a plurality of such devices, each of which can communicate with any other such device within the system and operate both as a system client and a system server to any other devices within the system.

2. Description of the Related Art

Video monitoring and surveillance of locations or areas for security, safety monitoring, asset protection, process control, and other such applications by use of closed circuit television and similar systems have been in widespread use for many years. The cost of these systems has come down significantly in recent years as the camera and monitor components have steadily dropped in cost while increasing in quality. As a result, these systems have proliferated in their application and are proving extremely useful for municipal, commercial, and residential applications.

Existing monitoring systems, however, suffer from a number of drawbacks relating to their use of a centralized network topology. Video and data from remotely-located units are transmitted via wireless communication to a centralized server for storage and viewing. One problem with that approach, however, is that in applications requiring a large number of units, available wireless bandwidth may limit the amount of data that can be transmitted to the server, especially considering that transmitting video, even compressed, is very bandwidth intensive. Range can also be an issue given that, all else equal range decreases as bandwidth increases.

The alternative to wireless communication is providing a hardwired, high-speed connection to each monitoring unit. That, however, is expensive and has to be rewired in the event a unit is moved to a new location.

In addition, because units of existing systems are not capable of stand-alone operation, they require connection to a server, even if only for receiving, storing, and processing the captured video and data. This significantly increases the costs per unit for applications with a relative low number of units.

BRIEF SUMMARY OF THE INVENTION

The present invention is a monitoring device with a board case having an open end and a closed end partially defining a lower housing space; a lid connected to the board case at the closed end to define an upper housing space; a power supply within the upper housing space; a printed circuit board assembly (PCBA) within the lower housing space and electrically connected through the closed end of the board case to the power supply, the PCBA having a CPU module with computer readable memory; a bracket assembly within the lower housing space; a camera module mechanically fixed to the bracket assembly; and a lens cover at least partially surrounding the camera module. In a network with a plurality of such devices, each device may be configured to communicate directly with each of the other monitoring devices without the use of a centralized server.

The present invention is a self-contained modular and nodal monitor device and system, where the device includes storage, rule-based analytics, multiple video camera feeds, high-voltage adapter, and universal connectivity. Each unit of the system is a decentralized standalone device that can capture, store, record, and stream video feeds from an internal image sensor or from an external camera connected via real time streaming protocol (RTSP) or similar standard. The system can also search by time or event and stream previously recorded video feeds. It can log different events and send alerts via SMS, email, http, or any other notification system.

When multiple units are logically connected together in a network, the unit software allows multiple video feeds from different cameras to be stored in one camera, and multiple video feeds from different cameras can be stored in different cameras simultaneously. Moreover, because there is no centralized server, it is more secure and harder with which to interfere or hack.

BRIEF DESCRIPTION OF THE SEVERAL VIEWS OF THE DRAWINGS

FIG. 3 is an assembly view of the unit of FIG. 2.

FIG. 4 is a top view of the lid of the unit of FIG. 3.

DETAILED DESCRIPTION OF THE VARIOUS EMBODIMENTS

Figure 1:
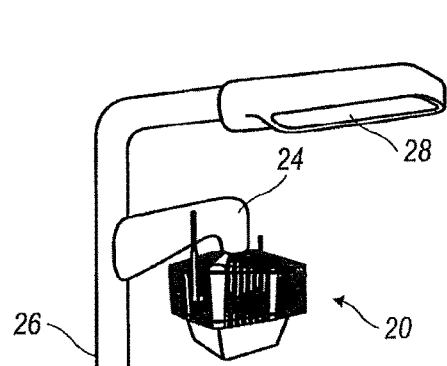
FIG. 1 shows a unit of the present invention installed on a street light.

Referring to FIG. 1, an embodiment 20 of the invention is shown mounted to a typical street light 22 with a mount 24. The light 22 includes a post 26 and a lamp 28. The mount 24 is hollow to provide a conduit for electrical connection to the same power source used by the lamp 28 through the interior of the post 26. Although shown mounted to a street light 22, the unit may also be mounted elsewhere, such as high voltage power lines, ceilings, walls, and the like.

Figure 2:
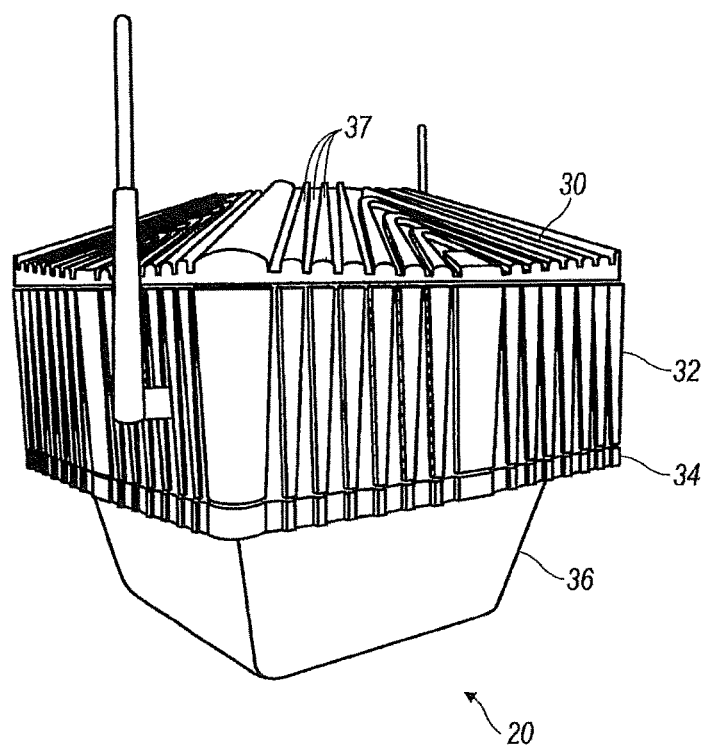
FIG. 2 is an enlarged view of the unit shown in FIG. 1.

Referring to FIG. 2, the embodiment 20 includes a lid 30, a board case 32, a lens ring 34, and a plastic lens cover 36. The lid 30, board case 32, and lens ring 34 are preferably made of aluminum ADC12 with a powder coating (50-70 micron) finish. The lens cover 36 is preferably made of polycarbonate with an optical grade finish. The outer surfaces of the lid 30 and board case 30 define ridges 37 to increase the surface area in contact with the surrounding air, which facilitates heat dissipation.

Referring to FIG. 3, together, the lid 30 and board case 32 define a frustum-shaped first housing space 38. The lid 30 is generally frustum shaped with a closed base 40 and an opposing open base 42. The board case 32 is a generally rectangular housing having an open end 44 and an opposing closed end 46. The lid 30 is mounted to the board case 32 at the closed end 46 and forms the first housing space 38. Two conduit openings 48 provide conduit pathways through the lid 30 into the housing space 38.

The housing space 38 is occupied by a daughter board 50 and a power supply 52. The daughter board 50 is mounted to the closed end 46 of the board case 32. The power supply 52 is mechanically bonded to the board case 32 and the lid 30, which act as heat sinks because of the ridges 37 and aluminum construction. Moreover, by isolating the power supply 52 within the upper housing space 38, heat is isolated from the other components of the unit 20.

On the other end of the unit 20, connection of the lens ring 34 and lens cover 36 to the open end 44 of the board case 32 defines a second, or lower, housing space 54. The second housing space 54 is separated from the first housing space 38 by the closed end 46. The lens cover 36 is generally a frustum with a closed end 56 and an open end 58. A lip 60 extends outward around the open end 58. The lens ring 34 defines a square opening 62 sized to fit around the lens cover 36 proximal to the lip 60. The lens ring 36 attaches to the open end 44 of the board case 32 to hold the lens cover 36 in place.

Three openings extend through the sides of the board case 32. First and second openings 64, 66 are positioned through opposing sides of the board case 32 and are occupied by antenna press plugs 68 for mechanical connection to antennae 70. The third opening 72 is occupied by a pressure compensating valve 74, which is preferably a POLYVENT PMF100519 protective vent manufactured by W. L. Gore & Associates, Inc.

A printed circuit board assembly (PCBA) 76 is mounted to the closed end 46 of the board case 32 within the lower housing space 54. The PCBA 76 is electrically connected to the daughter board 50, the power supply 52, and the antennas 70. The PCBA 76 is mechanically bonded to the board case 32, which acts as a heat sink.

A bracket assembly 78 is mounted to the closed end 46 of the board case 32 opposite the daughter board 50, and occupies the second housing space 54. The bracket assembly 78 includes a storage drive bracket 80 mounted to the closed end 46 of the board case 32. The storage drive bracket 80 has a generally U-shaped profile to hold a storage drive (e.g., a hard disk drive) 82 that is electrically connected to the PCBA 76.

The bracket assembly 78 also includes a first camera module bracket 84 and a second camera module bracket 86 mounted to the storage drive bracket 80. During setup of the unit, the first and second camera module brackets 84, 86 may be turned and rotated to aim the camera toward the desired field of view.

Camera modules 88 may be mounted to the first and second brackets 84, 86. Each camera module 88 includes multiple lens compatibility and may include fixed lenses ranging from 17° to 180°, auto iris lenses, autofocus lenses, and zoom lenses. In alternative embodiments, the bracket assembly 78 may also include pan and tilt motors that can move the camera modules 88 in two axes.

Referring to FIG. 4, the lid 30 has to threaded holes 90 in the closed base 40. The threaded holes 90 attached to bolts (not shown) extending downward from the mount 24 (see FIG. 1).

Figure 5:
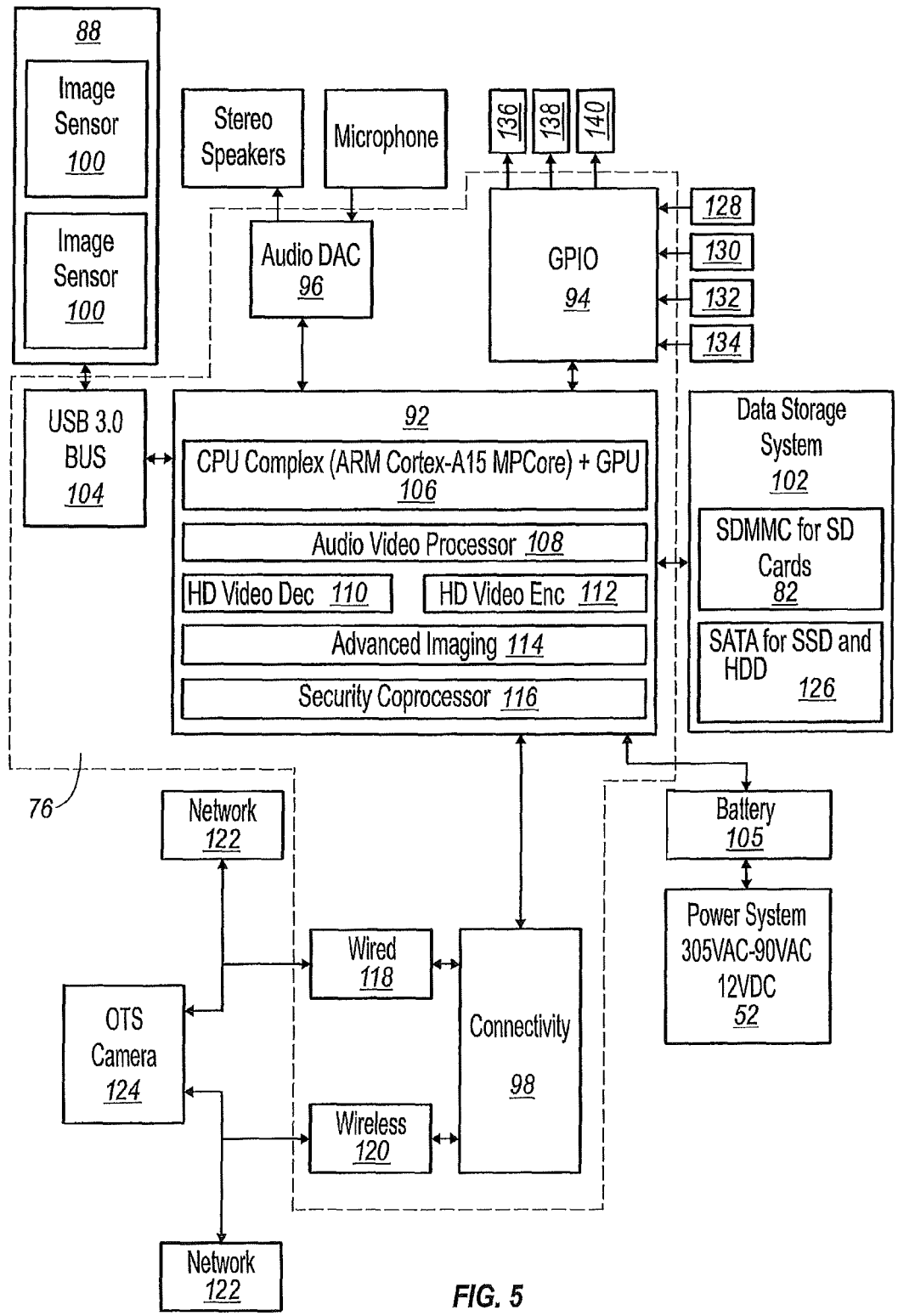
FIG. 5 is a system diagram of the unit of FIG. 2.

Referring to FIG. 5, the PCBA 76 includes a CPU module 92 electrically connected to each of a general purpose input/output (GPIO) module 94, an audio digital-to-analog converter (DAC) module 96, a connectivity module 98, the camera module 88 having two image sensors 100 and a data storage system 102. The CPU module 92 is electrically connected to the camera module 88 through a USB 3.0 bus 104. A battery 105 is electrically connected between the CPU module 92 and the power supply 52. The power supply 52 may range from 305-90 VAC, 12 VDC, PoE+, and is compatible with a solar power source.

The CPU module 92 includes a CPU Complex with a GPU 106, an audio/video processor 108, a high definition (HD) video decoder 110, an HD video encoder 112, an advanced imaging module 114, and a security coprocessor 116, which stores and allows access to secure data such as passwords and keys without allocation in memory. The connectivity module 98 provides for wired connection (e.g., ethernet, fiber optic, or USB) 118 or wireless connection 120 (e.g., wifi) to a larger network 122 or to an off-the-shelf (OTS) camera 124. The OTS camera 124 may be color, thermal, stereo, or magnetic.

The data storage system 102 includes an on-board high-reliability hard disk or solid state drive 82 and a secure digital memory (SD) card 126. In alternative embodiments, cloud services and scheduled uploads to various sites like Amazon Glacier, Google Drive, Dropbox may be employed.

The CPU module 96 is connected to several sensors, such as radar sensors 128, humidity sensors 130, water level probes 132, and water presence sensors 134 through the GPIO module 94. When these sensors reach operator-defined thresholds indicative of an unsafe water level condition, the software activates visual and auditory notification devices like flashing lights 136, LED signal screens 138, and audio awareness devices 140. It may also send notifications to the appropriate security personnel or first responders via SMS, phone, email, http or radio devices.

Figure 6:
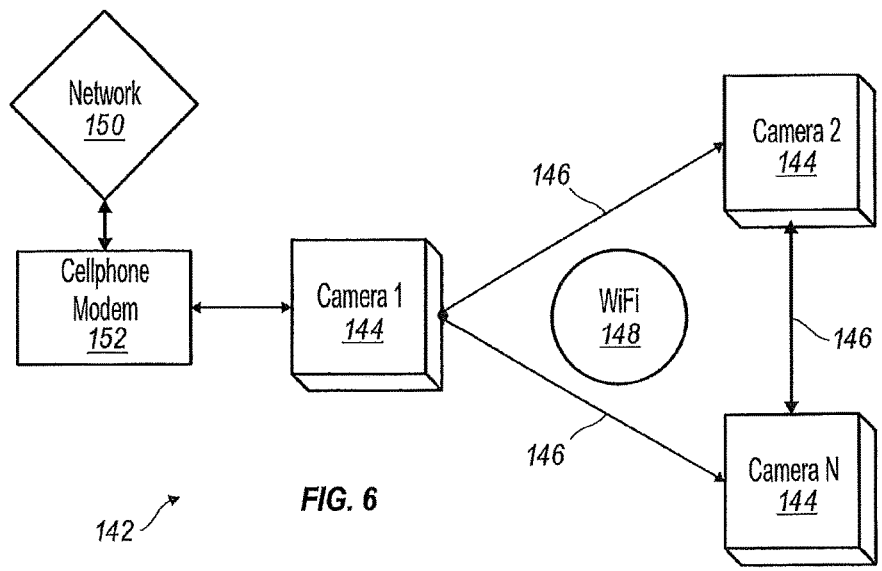
FIG. 6 is an exemplary network topology for the system of the present invention.

FIG. 6 shows an exemplary network topology 142 for a surveillance system made up of three units 144 as described with reference to FIGS. 1-5. In this topology, each unit 144 has two-way communication 146 with each other unit 144 via a wireless ad hoc network (WANET) 148. One unit acts as a bridge to a network 150 via a cell phone or hardwired connection 152.

Each device can send periodic "heartbeat" signals via any of its network connections. The packets composing the signals contain information of the camera system status (health). If it is not received by the server within an established timeframe, the camera would be considered offline. Heartbeat data is encapsulated in a DTLS protocol and includes a timestamp, sequence number, camera information, and health status of different services. DTLS protocol adds a cryptographically secure layer that encrypts the data and verifies the origin of the packet.

Each unit has the capability of connecting multiple high resolution cameras together on a low bandwidth network since they will only be transmitting messages and alerts as wanted. This may result in a significant reduction in cost regarding installing network devices and cabling as well as reduction in installation time.

Each unit can connect directly via wireless or wired methods to a third party off the shelf camera (color, thermal, stereo, magnetic, etc.) and use all of the unique features of the system, such as recording and storage, video analytics and notifications.

Each unit can run full analytics, such as facial recognition and license plate recognition on board rather than from a server. Specifically, each camera has a multicore CPU and GPU that enables running the analytics within the system as opposed to an external server.

Each unit can alert and notify selected users by email, SMS, or push video without the need of an additional server.

The surveillance system provides for automatic streaming bandwidth, resolution and framerate adjustment based on the device in the system which is accessing the camera. Specifically, when a device accesses a camera of the system through the web browser interface, the camera automatically detects and assesses parameters such as bandwidth, latency, and screen size. It then proceeds to adjust video stream settings such as kbps, resolution, fps and codec to a setting that best suits the client device.

Each unit is WebRTC based. WebRTC is a W3C proposed specification for the transmission of one or multiple streams of audio, video, or raw data in real time. When a device or browser is WebRTC-ready it means that the user does not have to install any plugin or secondary software to support this function and that it would be readily enabled without any interaction by the user.

The surveillance system provides network based data striping with parity. Three or more units can connect via internet protocol and form a striping array with parity. In this array, equal blocks of data and metadata from a video source are divided by the number of drives minus 1. Then a parity function (e.g., XOR) is applied to these blocks of data to create a parity block. If one of the blocks is missing, the block can be recreated with the data from the other blocks. This method effectively creates a backup copy across the array for each device in the array, so if, for example, a disk crash occurs or camera is stolen the data from that camera can be recovered applying a parity function to the rest of the data in the array.

Each unit supports the following networking topology configurations:

Wifi client mode: each unit can be a client of a wifi network.

Ethernet client mode: each unit of the system can connect through a wired Ethernet network.

3G/LTE client mode: each unit can connect through a 3G/LTE modem.

Router Mode: each unit can act as a router from any of interfaces (Wifi, Ethernet or 3G/LTE modem) to a Wifi or Ethernet network. If router mode is selected, the external network can have a fallback connection in case the primary interface loses connectivity. For example, if routing from external Ethernet network to internal wifi network, the 3G/LTE modem may act as a fallback if the Ethernet network loses connectivity. Connectivity loss would be determined by ICMP ping to a user.

Massive deployment configuration: a camera can be configured using DHCP parameters to send a TFTP, HTTP or HTTPS server in which configuration files reside. Configuration files can be global, group based, MAC address based or serial number based. Configurations are applied from more general to more specific, the latter overrides parameters of the former. For example a very simple global configuration can be made and details can be filled out with more specific group based or mac based configuration Camera web interfaces have traditionally supported live streaming. This feature as of today has been achieved in three ways. The first one is by installing a third party plugin (e.g., an ActiveX plugin or Java applet) therefore limiting the ability to view live streaming to OS-browser combinations that support those plugin. The plug-in technique also has a major drawback that it needs user confirmation to install by accepting some confusing or discouraging dialog forms.

The second way mostly found on high end cameras is done by using a continuously changing image element. This is not a video stream but a series of images being pulled from the camera usually by a JavaScript. This approach uses more bandwidth and introduces lag in the media signal, which defeats the purpose of real time.

The third way, which is uncommon, uses protocols like HLS or RTSP. As these protocols are not W3C, only browsers like IE or Safari support them and they may be obsolete in the future because of newer standard protocols like WebRTC.

In the present invention, each unit's GUI live playback is done using WebRTC API specification, which means that (1) users do not have to install any plugin or software; and (2) playback start almost immediately, in real-time, and saves bandwidth using a compressed protocol like VP8 or H264. The units detect the preferred codec by user browser and send video feed properly encoded.

The system can connect (via a media gateway) to older protocols like SIP. For example, each unit can "call" SIP IP video phones (as for example in a video intercom).

WebRTC also enables the units of the system to alert the user by making a WebRTC call to the user browser. For example a scenario would be a web page that controls many WebRTC enabled cameras, when one of the cameras has an alarm, the camera could then proceed to make a WebRTC connection to display the live feed real time. The camera also detects if the user browser does not support WebRTC and offer the installation of a plugin or doing a video feed using a series of images.

Figure 7:
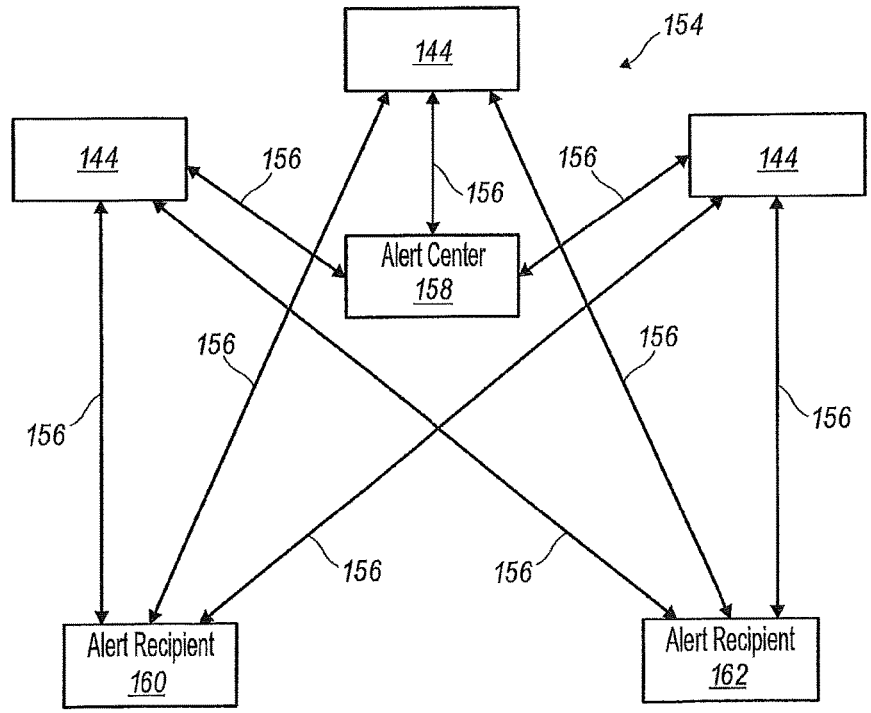
FIG. 7 is a second exemplary network topology for the system of the present invention.

FIG. 7 shows a second exemplary network topology 154 for a monitoring system made up of three units 144 as described with reference to FIGS. 1-5. In this topology 154, each unit 144 is in two-way communication 156 with an alert center 158, a first alert recipient 160, and a second alert recipient 162.

Figure 8:
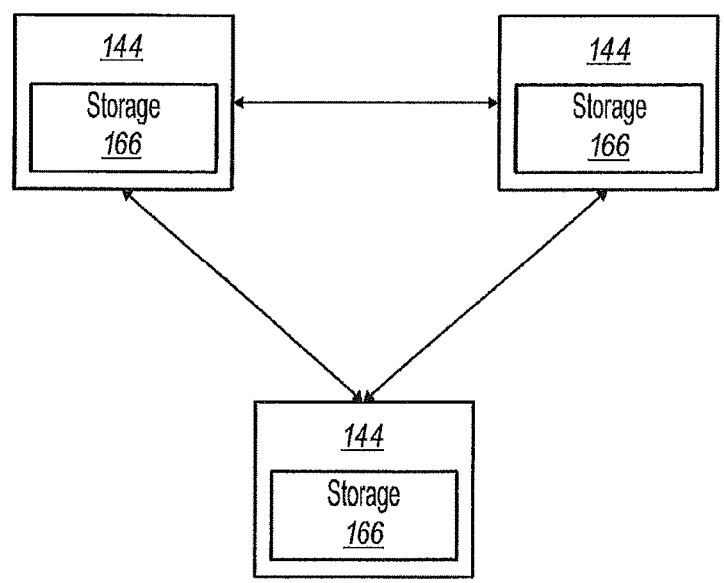
FIG. 8 is a third exemplary network topology for the system of the present invention.

FIG. 8 shows a third topology of three units 144, each having an internal data storage system 166 as described with reference to FIG. 1-5. In this topology, the data storage system 166 of each unit 144 is accessible by any of the other units 144 to provide, for example, network based automatic data mirroring: Two or more units can connect and form a mirroring array in which video data and metadata from one unit are copied synchronously to all devices storage in the array. Data can also copied asynchronously to ease networking demands. Video data can also be limited to a lower framerate to lower bandwidth requirements.

The present invention is described in terms of a preferred illustrative embodiment of specifically-described device and systems. Those skilled in the art will recognize that alternative constructions of such a device can be used in carrying out the present invention. Other aspects, features, and advantages of the present invention may be obtained from a study of this disclosure and the drawings, along with the appended claims.

We claim:

1. A monitoring device comprising:
    a board case having an open end and a closed end partially defining a lower housing space;
    a lid connected to the board case at the closed end to define an upper housing space;
    a power supply within the first housing space;
    a printed circuit board assembly (PCBA) within the lower housing space and electrically connected to the power supply, the PCBA having a CPU module with computer readable memory containing a set of computer readable instructions to:
  divide blocks of data from a video source;
  apply a parity function to each block of data to create a parity block;
  detect whether all blocks are received; and
  if one or more of the blocks is missing, recreate the missing block from the other blocks;
a bracket assembly within the lower housing space;
a camera module mechanically fixed to the bracket assembly; and
a lens cover at least partially surrounding the camera module.

2. The monitoring device of claim 1 further comprising a lens ring fixed to the housing, wherein a lip of the lens cover is between and in contact with the lens ring and the board case.

3. The monitoring device of claim 1 further comprising a data storage system within the lower housing assembly, the data storage system electrically connected to the PCBA.

4. The monitoring device of claim 1 wherein said bracket assembly comprises a camera module bracket connected to the camera module.

5. The monitoring device of claim 1 wherein the PCBA comprises a connectivity module logically connected to the CPU module, the connectively module providing for wired connection or wireless connection to network or to an off-the-shelf camera.

6. The monitoring device of claim 1 wherein the PCBA comprising a general purpose input/output (GPIO) module logically connected to the CPU module.

7. The monitoring device of claim 1 comprising a pressure-compensating valve occupying an opening through a side of the board case.

8. A monitoring system comprising:
  a plurality of monitoring devices, each monitoring device comprising:
    a board case having an open end and a closed end partially defining a lower housing space;
    a lid connected to the board case at the closed end to define an upper housing space;
    a power supply within the first housing space;
    a printed circuit board assembly (PCBA) within the lower housing space and electrically connected through the closed end of the board case to the power supply, the PCBA having a CPU module with computer readable memory;
    a bracket assembly within the lower housing space;
    a camera module mechanically fixed to the bracket assembly; and
    a lens cover at least partially surrounding the camera module;
  wherein each of the monitoring devices is configured to communicate directly with each of the other monitoring devices without the use of a centralized server; and
  a set of computer readable instructions contained within the computer readable memory of at least one of the monitoring devices to:
    equally divide blocks of data from a video source by the number of monitoring devices in the system minus one;
    apply a parity function to each block of data to create a parity block;
    detect whether all blocks are received by the intended monitoring device;
    if one or more of the blocks is missing, recreate the missing block from the other blocks.

9. The monitoring system of claim 8 further comprising an alert center configured to communicate directly with each monitoring device of the system.

10. The monitoring system of claim 8 wherein the plurality of monitoring devices contains a set of computer readable instructions to copy data from one unit to the data storage system of each other monitoring device of the system.

* * * * *